United States Patent [19]

Vignali

[11] Patent Number: 6,132,672
[45] Date of Patent: Oct. 17, 2000

[54] CERAMIC HIGH-TEMPERATURE COLORING PROCESS

[76] Inventor: Graziano Vignali, Via Della Pace 2 - Sasso Marconi, Bologna, Italy

[21] Appl. No.: 09/155,925

[22] PCT Filed: Apr. 8, 1997

[86] PCT No.: PCT/EP97/01731

§ 371 Date: Oct. 8, 1998

§ 102(e) Date: Oct. 8, 1998

[87] PCT Pub. No.: WO97/38952

PCT Pub. Date: Oct. 23, 1997

[30] Foreign Application Priority Data

Apr. 12, 1996 [IT] Italy .................................. MI96A0706

[51] Int. Cl.⁷ .................................................. C04B 33/34
[52] U.S. Cl. .......................... 264/643; 264/600; 264/601; 264/602; 264/644; 264/678; 264/680
[58] Field of Search ..................................... 264/600, 601, 264/602, 680, 644, 678, 643

[56] References Cited

U.S. PATENT DOCUMENTS 3,651,184  3/1972  Everhart et al. ......................... 264/601

FOREIGN PATENT DOCUMENTS

| 0704411 | 4/1996 | European Pat. Off. |
| 2012304 | 9/1971 | Germany. |
| 2117449 | 10/1972 | Germany. |
| 2715407 | 10/1978 | Germany. |
| 3109927 | 9/1982 | Germany. |

OTHER PUBLICATIONS

Chemical Abstracts, vol. 94, No. 4, Jan. 26, 1981, Abstract 19564–2, A. Villatoro, Coloration System for Ceramic Products.

Derwent Publications Ltd, Class A97, AN–115348, Apr. 1992.

*Primary Examiner*—James Derrington
*Attorney, Agent, or Firm*—Hedman, Gibson & Costigan, P.C.

[57] ABSTRACT

Composition for coloring ceramic articles obtained from ceramic mass containing $TiO_2$ as such, in shades ranging from yellow to orange, consisting of an aqueous or hydroalcoholic solution to be applied to the surface to colored before final firing and containing soluble compounds of chromium/antimony or of chromium/zinc or chromium/zirconium or chromium/manganese mixtures.

7 Claims, No Drawings

CERAMIC HIGH-TEMPERATURE COLORING PROCESS

FIELD OF THE INVENTION

The present invention relates to compositions for colouring ceramic products and the relevant colouring process.

In particular the compositions according to the present invention consist of aqueous or hydroalcoholic solutions of an inorganic salt or organic derivative of chromium in combination with an inorganic salt or organic derivative of a metal selected from antimony, zinc, zirconium, manganese, which allow the obtainment of ceramics in a particular colour, by using ceramic supports which contain some amount of $TiO_2$ added as such to the ceramic mass before the molding. Furthermore, said solutions may also be used in combination with solutions of other metallic cations to obtain particular shades.

STATE OF THE ART

The use of coloured ceramics as well as the compositions and processes meant for obtaining said colours have been known since long. One of the most common methods is based on the addition of powdered pigments, in particular inorganic oxides and mineral colouring matters, to the ceramic mass (vitrified stoneware) before firing. The ceramic product obtained is coloured through its whole thickness, with considerable consumption of colouring matter, which is the most expensive component.

Considering that colouring inside ceramic articles is superfluous, the material being not transparent, studies were conducted to develop methods for colouring the ceramics surface only, with a considerable saving of costly materials.

A method developed to this end is based on pigments addition to the surface of ceramics (in particular tiles), already in the mold, before final pressing and firing.

Said technique is especially used for vitrified stoneware tiles as it produces a 2 to 3 mm thick surface layer that may also be smoothed. Said method is material-saving, the colour being imparted only to a thin layer of the ceramic product; however, it is hardly viable as it requires devices for metering and feeding, in the molds for ceramics, the amounts and types of pigments needed for obtaining the desired products. Moreover, it does not allow the obtainment of particularly complex products.

Another process consists in causing the surface of the ceramic material to absorb an aqueous solution of inorganic salts or of metal organic derivatives (as described, e.g., in Sprechsal, vol. 119, No. 10, 1986 and in EPA 0 704 411) after partial firing (as disclosed, e.g., in German patent No. 2,012,304) or simply after molding and before firing (as disclosed, e.g., in Swiss patent No. 575,894), said inorganic salts and metal organic derivatives being transformed into colourants, stable at a high temperature, during ceramic firing. The aqueous solution is applied to the ceramic material e.g. by dipping or spraying or disk treatment or silk-screen process.

The aqueous solution is applied to the ceramic material before final firing.

A colouring of this type is particularly advantageous as it allows the obtainment of very thin coloured layers. It is widely used in the case of flat articles (such as for example tiles for floors and walls).

A further problem set by the use of colours in aqueous solution is the depth to which the colouring matter penetrates into the ceramic material. In fact, experimental evidences have been provided that the penetration depth depends on various parameters, such as the colouring solution viscosity and surface tension, the application temperature, the quantity of water sprayed on the manufacture after application of the colouring solution, the application technique.

This last parameter, i.e. the application technique, is of great importance: in fact, whereas the amount of colouring solution that 10 may be applied by disk treatment or spraying may be as high as 400 to 600 g/m2, by silk-screen techniques it may generally be 100 to 200 g/m2.

Silk-screen techniques are particularly asked for being the only ones allowing the obtainment of graphics, drawings and decorations, and requiring lower amounts of colourant. Colourant penetration into the ceramic material before firing takes place with relatively high amounts of water or of other products after application of the colouring solution. However, the resulting colours are less intense than obtainable by the other techniques.

Colouring matter penetration into the ceramic material is of particular importance in the case of smoothed vitrified stoneware tiles. The phrase "smoothed vitrified stoneware" is used herein to mean a vitrified stoneware whose surface is abraded by diamond wheels through a thickness of 0.8 to 1.5 mm, smoothed and felt-polished to a glassy surface. Obviously, colouring of stoneware to be polished after firing will require colourant penetration to a depth of 1.6 mm min.
Technical problem Since colouring of ceramic materials by disk treatment or spraying is easy to carry out, the ceramic industry is obviously highly interested in finding new substances compatible with said techniques.

The technical problem to be solved is that said new substances be easily transformed into colorants stable at a high temperature, be capable of imparting the desired colour in the desired shade to the manufacture, without too great a consumption of colourant, and that colorant penetration into the ceramic material be deep.

Unfortunately, very few are the colours available so far. In particular, the lack of yellow and orange shades is especially felt by the industry of vitrified stoneware, new aesthetic solutions being always needed.

Moreover, since yellow is a primary colour, the lack of products imparting the aforesaid shades makes it impossible to obtain many other colours.

DETAILED DESCRIPTION OF THE INVENTION

The Applicant, who has many years' experience in the production and sale of colouring matters for ceramic tiles, has now found that aqueous or hydroalcoholic solutions of inorganic salts or organic derivatives of chromium in combination with inorganic salts or organic derivatives of a metal chosen from antimony, or zinc, or zirconium or manganese, give, after firing, shades ranging from yellow to orange yellow, to orange, to orange beige, to Havana orange.

The resulting colours depend on the weight ratio antimony/chromium, zinc/chromium, zirconium/chromium, manganese/chromium in the solution as well as on the $TiO_2$ content, and the $Al(OH)_3$ content, if any, in the ceramic support (before firing).

Said aqueous or hydroalcoholic solutions are particularly suitable for colouring vitrified stoneware tiles, either smoothed or not, also by silk-screen application techniques.

It is an object of the present invention to provide aqueous or hydroalcoholic solutions of inorganic salts or organic derivatives of antimony and chromium, or zinc and chromium, or zirconium and chromium, or manganese and chromium, for treating molded articles made of ceramic mass added before molding, with 0.5% and up to 10% (preferably at least 1%) by w. (on the dry material) of $TiO_2$ and optionally also with 1% to 8% by wt. of $Al(OH)_3$, (dry basis) or of equivalent amount of $Al_2O_3$, to obtain, after firing, a coloring of ceramic articles in yellow, or orange yellow or orange or beige orange or orange Havana.

It is a further object of the present invention to combine the aformentioned inorganic salts or organic derivatives of chromium and antimony, or chromium and zinc, or chromium and zirconium, or chromium and manganese, with other inorganic salts or organic derivatives of metals already known for colouring ceramic supports such as V, Ni, Co, Fe to obtain not yet available colours or shades.

Although the salts of sulphuric, hydrochloric, and nitric acids are particularly economic and suitable for obtaining the desired colours, they bring about the formation of corrosive gases during firing; consequently, kilns provided with flue gas abatement devices are required. It is, therefore, preferred to use, whenever possible, organic derivatives that, during firing, are thermally decomposed to give water and carbon dioxide. Particularly suitable are the salts of mono- or polycarboxylic organic acids containing 1 to 18 carbon atoms, with 1 to 5 substituents, if any, in the aliphatic chain, which may be hydroxy, amino, mercapto groups.

The following carboxylic acids are reported by way of example and not of limitation: acetic, formic, propionic, butyric, lactic, glycolic, tartaric, citric, oxalic, maleic, citraconic, fumaric, gluconic, aminoacetic, aminoadipic, aminobutyric, aminocaproic, aminocaprylic, 2-amino-4-hydroxybutyric, aminoisobutyric, aminolevulinic, thioglycolic acids.

According to the present invention, suitable organic derivatives are also those with polymeric polycarboxylic acids, such as polymers and copolymers of acrylic or methacrylic acid and vinyl ether copolymers with maleic anhydride and acrolein.

The amounts of inorganic salts and organic derivatives to be added to the ceramic material prior to firing to obtain the desired colour must be such as to secure the application on the surface of the material to be coloured, of the following colouring ingredients:

in the case of the chromium/antimony mixtures an amount of Sb between 1 and 90 $g/m^2$ (preferably 3÷48 $g/m^2$) and of Cr between 0.1 to 30 $g/m^2$ (preferably 0.8÷15 $g/m^2$)
in the case of the chromium/zinc mixtures an amount of Zn between 1 and 60 $g/m^2$ (preferably 2÷30 $g/m^2$) and of Cr between 0.05 and 20 $g/m^2$ (preferably 0.05÷12 $g/m^2$)
in the case of the chromium/zirconium mixtures an amount of Zr between 1 and 60 $g/m^2$ (preferably 2÷30 $g/m^2$) and of Cr between 0.05 and 20 $g/m^2$ (preferably 0.05÷12 $g/m^2$)
in case of chromium/manganese mixtures an amount of Mn between 1 and 40 $g/m^2$ (preferably 2÷32 $g/m^2$) and of Cr between 0.05 and 20 $g/m^2$ (preferably 0.05÷12 $g/m^2$)
all the amounts above reported being expressed as element. At a higher chromium concentration, the colour gradually turns from orange yellow to orange beige. For example, at an antimony/chromium ratio of 6, the colour is yellow with a light shade of orange, at a ratio of 3.3, the colour is orange yellow, and at a ratio of 1.5 the colour is intense orange.

The typical process for the application of the colouring compositions according to the invention consists of the following essential steps:

a) drying at 100° C. of the molded article to be coloured to a water residue of 0.5% by wt. max.;
b) treatment of the article coming from preceding step with the colouring composition in aqueous solution in an amount of 30 to 600 g/m2 of the final coloured surface;
c) equalization of the article coming from preceding step at room temperature for a period of 8 hours to homogenize the solution absorption;
d) subsequent firing according to the normal ceramic cycle.

The following intermediate operative steps are optional.
between step a) and step b) it is carried out a pre-treating of the dried article from step a) with water in an amount of max. 300 $g/m^2$ of the article surface
between step b) and step c) it is carried out a post-treatment of the article coming from step b) with water in amount of max. 300 $g/m^2$ of the article surface.

The aqueous solution of the colouring agent according to the invention can be converted in a paste suitable for the application on the ceramic surface through the silk-screen method, by addition of a thickening agent for instance glucomannan in amount of the order of 1% by w.

The ceramic mass compositions (% by wt.) used for the tests are reported below:

A) $SiO_2$=64.4%; $Al_2O_3$=21.8%; $K_2O$=3.8%; $Na_2O$=0.8%; CaO=0.6%; MgO=0.1%; $TiO_2$=0.4%; $Fe_2O_3$=0.2%; $ZrSiO_4$=5%; $H_2O$ balance to 100%.

In the analytical data of the ceramic mass type A is reported the content of $TiO_2$=0.4%. In fact this datum is an analytical expression which merely means that the titanium present in different chemical forms, for instance as Ti silicate, corresponds to an amount of $TiO_2$ of 0.4%.

B) $SiO_2$=64.4%; $Al_2O_3$=21.8%; $K_2O$=3.8%; $Na_2OO$=0.8%; CaO=0.6%; MgO=0.1%; $TiO_2$=5.4%; $Fe_2O_3$=0.2%; $H_2O$ balance to 100%.

The ceramic mass B has been obtained by introducing in a ceramic mass type A 5% by w. of $TiO_2$ instead of 5% of zirconium silicate.

C) $SiO_2$=64.4%; $Al_2O_3$=21.8%; $K_2O$=3.8%; $Na_2O$=0.8%; CaO=0.6%; MgO=0.1%; $TiO_2$=3.4%; $Fe_2O_3$=0.2%; $H_2O$ balance to 100%.

The ceramic mass C has been obtained by introducing in the ceramic mass, 3% by w. of $TiO_2$ instead of 5% of zirconium silicate.

EXAMPLES 1 TO 30

A series of colouring tests were conducted according to the following process.

Some 33 cm×33 cm tiles were press molded, dried at 100C to a water residue of 0.1% (weight loss after 4 hrs at 120° C.), cooled to room temperature, sprayed with 50 g/m2 distilled water (pretreatment) and with 250 g/m2 of colouring matter in aqueous solution (treatment).

Once the tiles had undergone said treatment, they were allowed to stand at room temperature for 8 hrs (equalization) and fired in a roller kiln according to a standard cycle for vitrified stoneware (at a temperature of 1200° C. max.).

After firing, one tile was cut and colour penetration was measured by an optical microscope. Another tile was smoothed by diamond wheel abrasion through 1.2 mm and the colour layer thickness was recorded. The parameters used in the various tests and the results obtained are reported in Table 1.

TABLE 1

| (1) | (2) | (3) Content in % by w. of cations (as element) in the solution | (4) | (5) | (6) |
|---|---|---|---|---|---|
| 1 | B | Sb 2.8 Cr 0.85 | 1.8 | orange yellow | orange yellow |
| 2 | C | Sb 2.8 Cr 0.85 | 1.8 | orange yellow | orange yellow |
| 3 | A | Sb 2.8 Cr 0.85 | 1.8 | colourless | colourless |
| 4 | B | Sb 2.5 Cr 1.7 | 1.8 | orange | orange |
| 5 | C | Sb 2.5 Cr 1.7 | 1.8 | orange | orange |
| 6 | A | Sb 2.5 Cr 1.7 | 1.8 | light beige | light beige |
| 7 | B | Sb 2.2 Cr 2.55 | 1.8 | deep orange | deep orange |
| 8 | C | Sb 2.2 Cr 2.55 | 1.8 | deep orange | deep orange |
| 9 | A | Sb 2.2 Cr 2.55 | 1.8 | sand | sand |
| 10 | B | Sb 1.9 Cr 3.4 | 1.8 | beige orange | beige orange |
| 11 | C | Sb 1.9 Cr 3.4 | 1.8 | beige orange | beige orange |
| 12 | A | Sb 1.9 Cr 3.4 | 1.8 | sand | sand |
| 13 | B | Zn 5.4 Cr 0.85 | 1.8 | beige yellow | beige yellow |
| 14 | C | Zn 5.4 Cr 0.85 | 1.8 | beige yellow | beige yellow |
| 15 | A | Zn 5.4 Cr 0.85 | 1.8 | very light beige | colourless |
| 16 | B | Zn 4.8 Cr 1.7 | 1.8 | Havana yellow | Havana yellow |
| 17 | C | Zn 4.8 Cr 1.7 | 1.8 | Havana yellow | Havana yellow |
| 18 | A | Zn 4.8 Cr 1.7 | 1.8 | Havana | light Havana |
| 19 | B | Zr 5.4 Cr 0.85 | 1.8 | beige yellow | beige yellow |
| 20 | C | Zr 5.4 Cr 0.85 | 1.8 | beige yellow | beige yellow |
| 21 | A | Zr 5.4 Cr 0.85 | 1.8 | very light beige | colourless |
| 22 | B | Zr 4.8 Cr 1.7 | 1.8 | Havana yellow | Havana yellow |
| 23 | C | Zr 4.8 Cr 1.7 | 1.8 | Havana yellow | Havana yellow |
| 24 | A | Zr 4.8 Cr 1.7 | 1.8 | Havana | light Havana |
| 25 | B | Mn 5.4 Cr 0.85 | 1.8 | Havana yellow | Havana yellow |
| 26 | C | Mn 5.4 Cr 0.85 | 1.8 | Havana yellow | Havana yellow |
| 27 | A | Mn 5.4 Cr 0.85 | 1.8 | light beige | light beige |
| 28 | B | Mn 4.8 Cr 1.7 | 1.8 | orange Havana | orange Havana |
| 29 | C | Mn 4.8 Cr 1.7 | 1.8 | orange Havana | orange Havana |
| 30 | A | Mn 4.8 Cr 1.7 | 1.8 | light Havana | light Havana |

(1) example number
(2) ceramic mass used
(3) Content % by w. of cations (i.e. metal compounds) expressed as elements in the used solution. Antimony is used in form of Sb hydroxysuccinate stabilized with potassium (weight ratio Sb/K = 3)
Chromium is used in form of Cr tris-etanoate
Zirconium is used in form of Zr bis-hydroxy bis-etanoate
Manganese is used in form of Mn bis-etanoate
Zinc is used in form of Zn bis-etanoate
(4) colour penetration (mm)
(5) surface colour before the smoothing
(6) surface colour after the smoothing Note
The tests with the ceramic mass type A wherein $TiO_2$ as such has not been added as reported above, are given for comparison purpose: from these tests it results a colouring in some cases absolutely insufficient, in other cases too faint and in any case not corresponding to the specific colouring according to the invention.

What is claimed is:

1. Process for obtaining ceramic articles coloured, on the surface and below the surface for at least 1.6 mm, in colours ranging, after firing, from yellow to orange, said process comprising adding to a ceramic mass before moulding from 0.5% to 10% by weight of $TiO_2$ based on the dry material and treating the moulded articles in a process according to the following operative steps:

a) drying at 100° C. the molded article to be coloured to a maximum water residue of 0.5% by weight;

b) treating the article coming from the preceding step with an aqueous solution of an organic or inorganic Cr compound and an organic or inorganic compound of an element selected from Sb or Zn or Zr or Mn or their mixtures, said solution containing compounds of the above elements in such concentrations that when applied to the ceramic surface in an amount of 30 to 600 $g/m^2$ secures the application of metal elements based on the total weight of elements present as follows:

a) 0.1 to 30 $g/m^2$ of Cr and 1 to 90 $g/m^2$ of Sb, or b) 0.05 to 20 $g/m^2$ of Cr and 1 to 60 $g/m^2$ of Zn, or c) 0.05 to 20 $g/m^2$ of Cr and 1 to 60 $g/m^2$ of Zr, or d) 0.05 to 20 $g/m^2$ of Cr and 1 to 40 $g/m^2$ of Mn c) equalization of the article coming from the preceding step, at room temperature for a period of 8 hours;

d) subsequent firing according to a ceramic cycle.

2. Process according to claim 1 wherein $Al(OH)_3$ is added to the ceramic mass in an amount of 1%–8% by wt based on the dry material.

3. Process according to claim 1 wherein the compound of Cr, Sb, Zn, Zr and Mn are salts of mono- or polycarboxylic organic acids containing 1 to 18 carbon atoms, optionally having 1 to 5 substituents in the aliphatic chain selected from the group consisting of hydroxy, amino and mercapto groups.

4. Process according to claim 1 wherein between step a) and step b) the following intermediate step is carried out:

a.1) pre-treating the dried article from step a) with water in an amount up to a maximum of 300 $g/m^2$ of said article surface.

5. Process according to claim 1, wherein between step b) and step c) the following intermediate step is carried out:

b.1) post-treatment of the article from step b) with water in an amount up to a maximum of 300 $g/m^2$ of said article surface.

6. Process according to claim 1, wherein both pre-treatment step and a post-treatment step are employed comprising pre-treating the dried article obtained from step a) with water in an amount up to a maximum of 300 g/m$^2$ of said article surface and post-treating the article from step b) with water in an amount up to a maximum of 300 g/m$^2$ of said article surface.

7. Process for colouring ceramic articles according to claim 1 wherein after the firing the ceramic articles, the articles are subjected to a partial abrasion up to a thickness of 0.8 to 1.5 mm and to a final smoothing of the surface.

\* \* \* \* \*